United States Patent [19]
Fujie et al.
[11] Patent Number: 4,573,798
[45] Date of Patent: Mar. 4, 1986

[54] METHOD AND APPARATUS FOR MEASURING PATTERN AREA PERCENTAGE FOR ENGRAVING FILMS

[75] Inventors: Hideo Fujie, Shizuoka; Kousaku Togashi, Yokohama, both of Japan

[73] Assignee: Toshiba Kikai Kabushiki Kaisha, Tokyo, Japan

[21] Appl. No.: 408,128

[22] Filed: Aug. 13, 1982

[30] Foreign Application Priority Data

Sep. 16, 1981 [JP] Japan ................................ 56-145845
Sep. 16, 1981 [JP] Japan ................................ 56-145844

[51] Int. Cl.$^4$ ................................ G01B 11/28
[52] U.S. Cl. ................................ 356/432; 356/380; 356/444
[58] Field of Search ................ 250/559, 571; 356/429, 356/432, 443, 444, 380

[56] References Cited

U.S. PATENT DOCUMENTS 3,741,664 6/1973 Torin ................................ 250/559
3,853,409 12/1974 Gaillochet ................................ 356/432
3,985,451 10/1976 Plöckl ................................ 250/571
4,180,741 12/1979 Palmatier et al. ................................ 250/559

FOREIGN PATENT DOCUMENTS 2087684 5/1982 United Kingdom ................ 356/444

*Primary Examiner*—Vincent P. McGraw
*Assistant Examiner*—S. A. Turner

[57] ABSTRACT

Apparatus for measuring pattern area percentage of engraving film with a transparent member for placing the film thereon, an optical device having a light source and light receiving unit, a moving device for relatively moving the transparent member and the optical device, and a control device which has a memory for storing the data concerning the light transmission quantities given by the optical device and a calculating device for calculating pattern area percentage corresponding to each column defined on the printing plate of a printing machine used. The number and width of columns of the printing plate varies depending on the number and spacings of ink supply keys. The control device controls the moving device which moves the placing member in the direction of each column. The optical device has a slit which width can be changed in accordance with the number and widths of ink supply keys mounted on a primary machine used.

4 Claims, 23 Drawing Figures

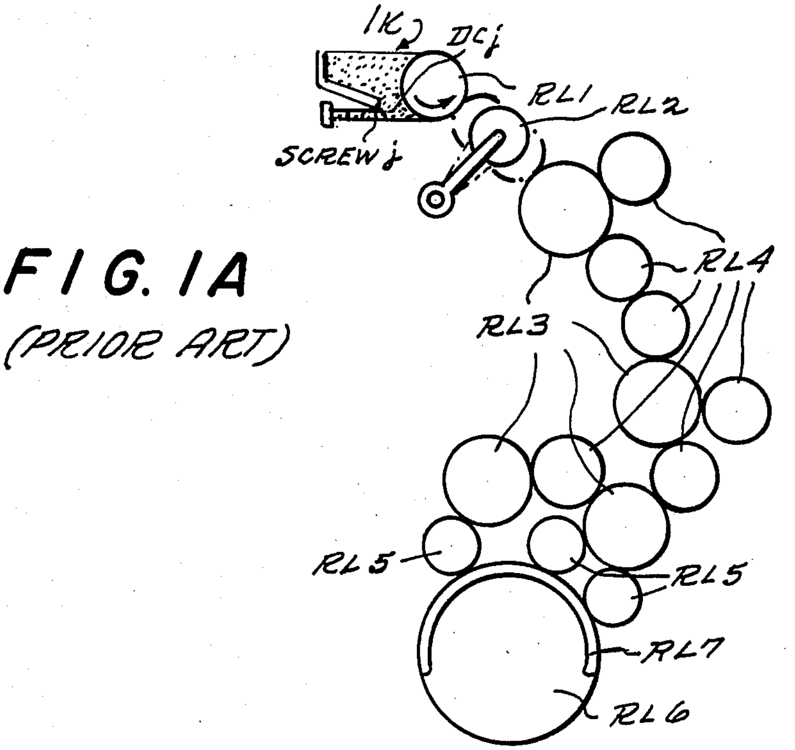
FIG. 1A
(PRIOR ART)
FIG. 2
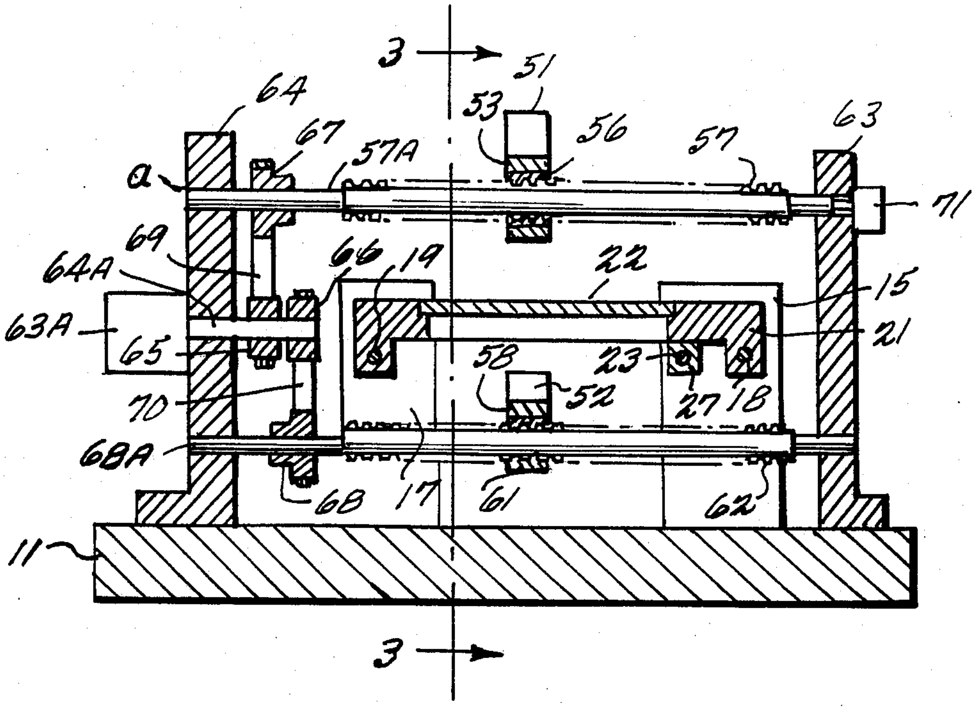

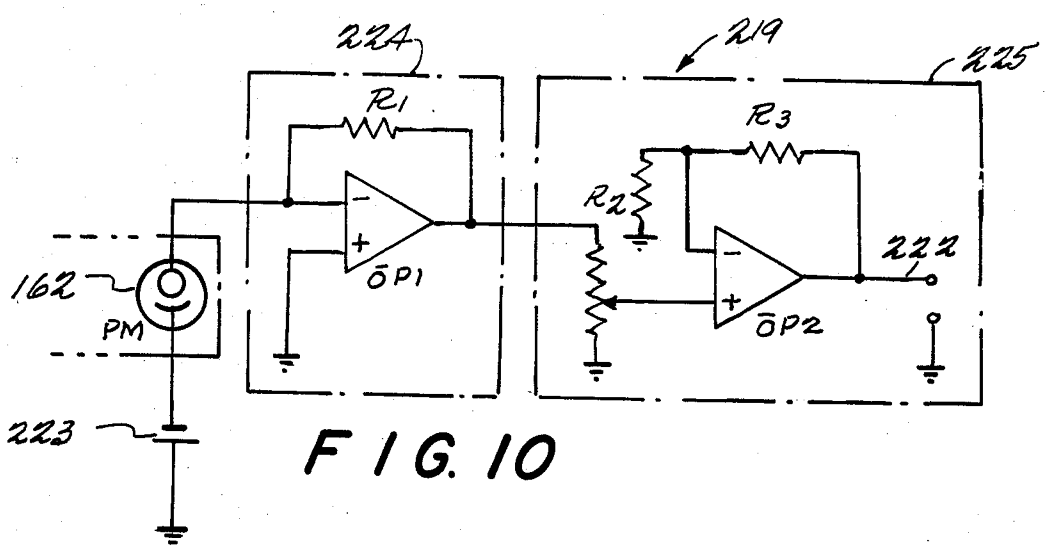
FIG. 10
FIG. 11
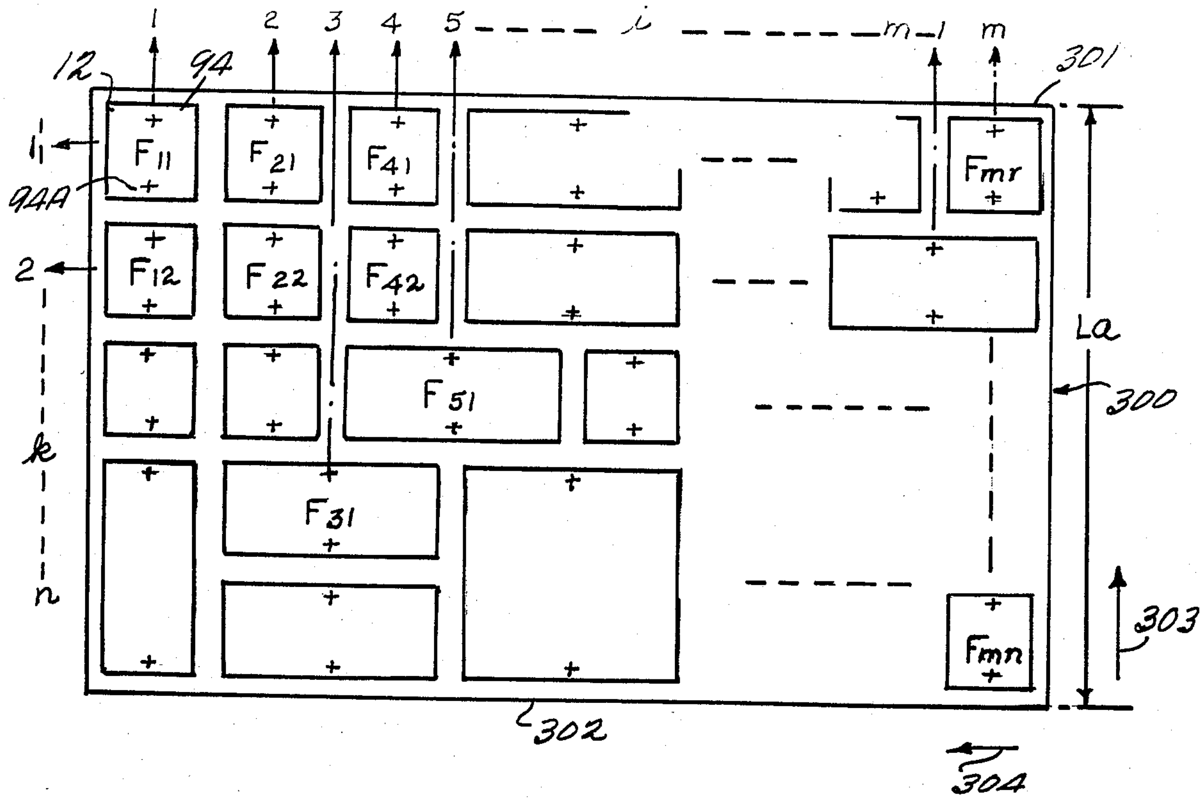

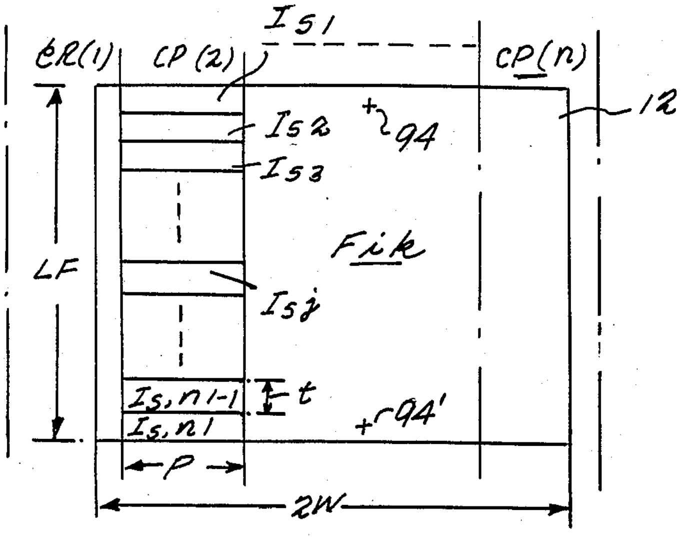
FIG. 19
FIG. 20
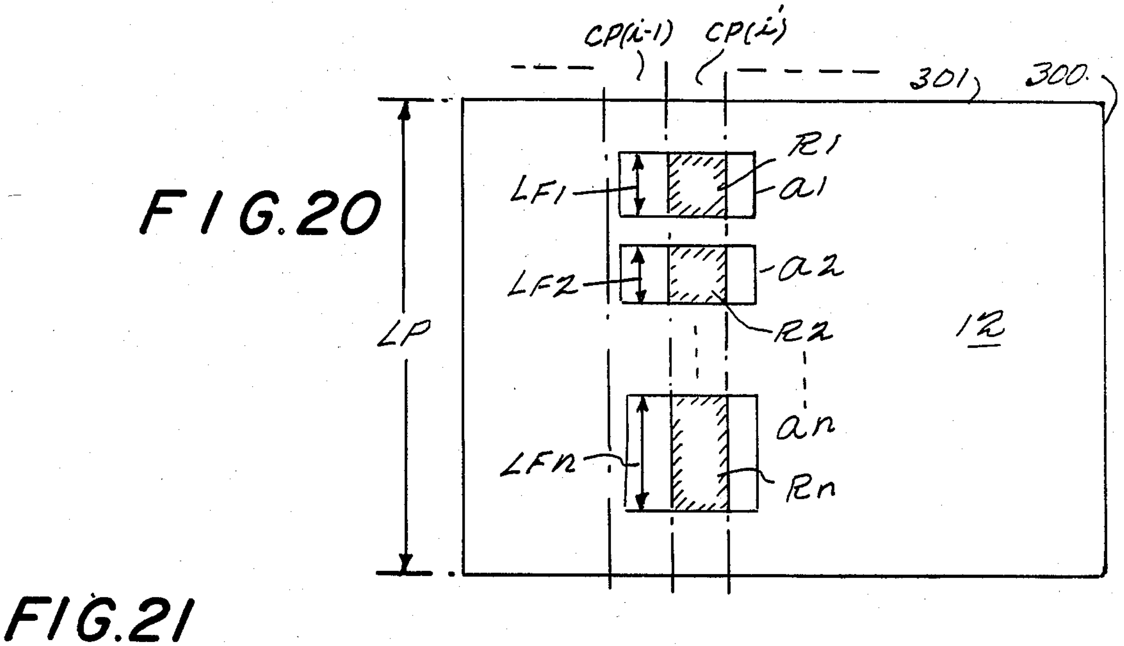
FIG. 21
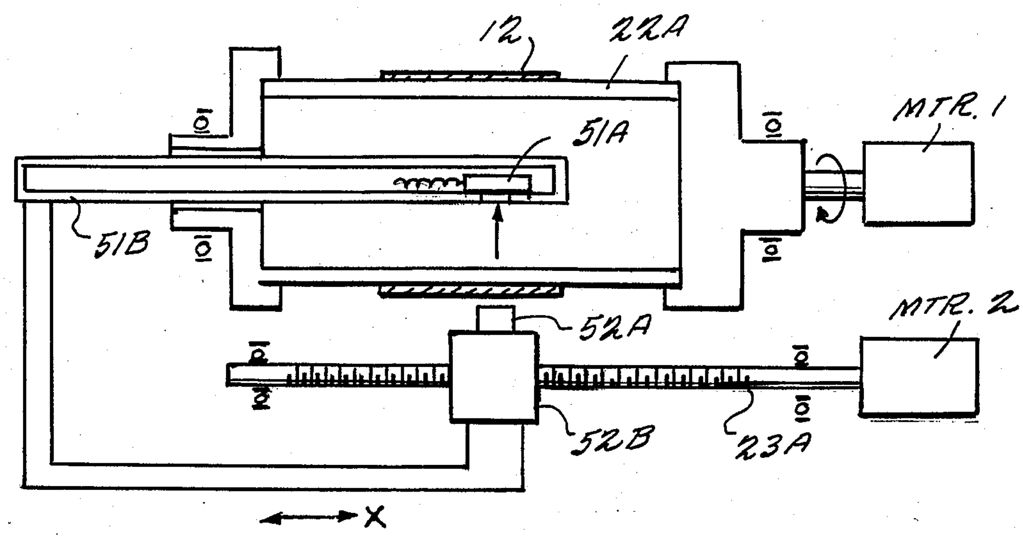

METHOD AND APPARATUS FOR MEASURING PATTERN AREA PERCENTAGE FOR ENGRAVING FILMS

BACKGROUND OF THE INVENTION

1. Field of Invention

This invention relates to method and apparatus for optically measuring the pattern areas which are necessary for presetting an ink supply in offset printing from an engraving film.

2. Description of the Prior Art

In offset printing, it is necessary that the ink supply be different for each of a number of columns which are created by widthwise division along the printing direction.

For example, as shown in FIG. 1A more specifically, the ink in an ink reservoir IK is supplied through a reservoir roller RL1, a transfer roller RL2, averaging rollers RL3, kneading rollers RL4 and ink applying rollers RL5 to a printing plate RL7 which is attached to the outer circumference of a printing drum RL6.

This supply is controlled such that the gap between a doctor blade DCj and the roller RL1 is adjusted by turning a screw SCRj. Several doctor blades DCj and screws SCRWj are provided in the axial direction of the roller RL1 for respective columns CP(i) (as shown in FIG. 18).

As described above, the ink supply device for offset printing is usually constructed such that the ink from the ink reservoir passes through a roller train composed of the plurality of rollers until a sheet of ink having a uniform thickness is supplied onto the printing plate. Moreover, the ink is applied only to the pattern portion, so the ink corresponding to nonpattern portions is left on the roller train.

It is, therefore, necessary that the ink be supplied at a rate corresponding to the consumption rate from the ink reservoir.

It is usual that the consumption rate of the ink is proportional to the area of the pattern portion (i.e., the pattern area). Since the areas of non-pattern portions are different in the widthwise direction of the printed matter, it is, therefore, necessary in offset printing that the ink supply be adjusted in the widthwise direction of the printed matter. For this necessity, the printing surface is widthwise divided into columns having a suitable width (e.g. 30 mm), for which the ink supply is respectively adjusted.

In order to improve the productivity of the printing process and to reduce inferior printing, it is necessary that the aforementioned ink supplies for the respective columns be preset before printing begins. In order to get data for that presetting operation, moreover, it is necessary that the area of the pattern portions or the non-pattern portions be measured for the aforementioned reasons. For measurement of the pattern areas, there has already been known in the art a system in which the images corresponding to the images to be printed are optically scanned to calculate the areas of the image portions, respectively, for the adjusting columns. The image holders to be scanned may be a proof, a printing plate or an engraving film.

The former two are measured by a reflection detecting system, whereas the engraving film can be measured by a light transmissive detecting system.

In case the pattern area is to be optically measured, the measurement of the engraving film is advantageous. However, the usual printing plate is so constructed that a plurality of films are arranged in predetermined positions and printed. In case the films are to be measured, therefore, it is necessary that, after the pattern areas of the respective films have been measured, the measured data be summed up again in a manner to correspond to the positions to which the films are assigned. This task become more difficult as the layout of the printing plate becomes more complex.

SUMMARY OF THE INVENTION

It is, therefore, a first object of the present invention to provide a method and apparatus for automating the task of summing up the data, which are measured from films, in accordance with the layout of a printing plate so as to eliminate the aforementioned disadvantages while retaining the advantages in case the films are to be measured.

A second object of the present invention is to provide an apparatus in which fluctuations in the measured data are minimized by performing the scanning operations with an integrated light source and light receiving unit when the pattern areas of the film is to be optically measured.

A third object of the present invention is to provide a pattern area measuring apparatus in which the measurement spot lengths, which correspond to the column width made different with the printing machine, can be automatically varied so that it may be applied to all the printing machines. The apparatus of the present invention is essentially provided with a measuring device for measuring the blackness of an engraving film, which film is formed with a pattern portion necessary for printing, by photoelectrically scanning the respective columns which are divided in advance; and a control device either for imparting a necessary command to that measuring device or for feeding out the output of the measured data, which are measured by that measuring device, after the measured data have been once stored and subjected to a necessary calculation.

THE BRIEF DESCRIPTION OF THE DRAWINGS

FIG. 1A is a schematic view showing the passage of ink to be supplied from ink reservoir to the printing surface;

FIG. 2 is a sectional view taken along line 2—2 of FIG. 1B;

FIG. 10 is a detail circuitry diagram showing the detecting circuit shown in FIG. 9;

FIG. 11 is a diagram illustrating the correspondences between plural films which are arranged on the printing plate, and their members;

FIG. 19 is a diagram illustrating the relationship between each of the stop positions of the slit being measured on one film and measured quantity of light at each of the position;

FIG. 20 is a diagram illustrating the measured valves Ri for the various films on one column; and FIG. 21 is a schematic view showing the construction of another measuring apparatus which is used to practice the present invention.

DESCRIPTION OF THE PREFERRED EMBODIMENT

Figures 1B, 1C:
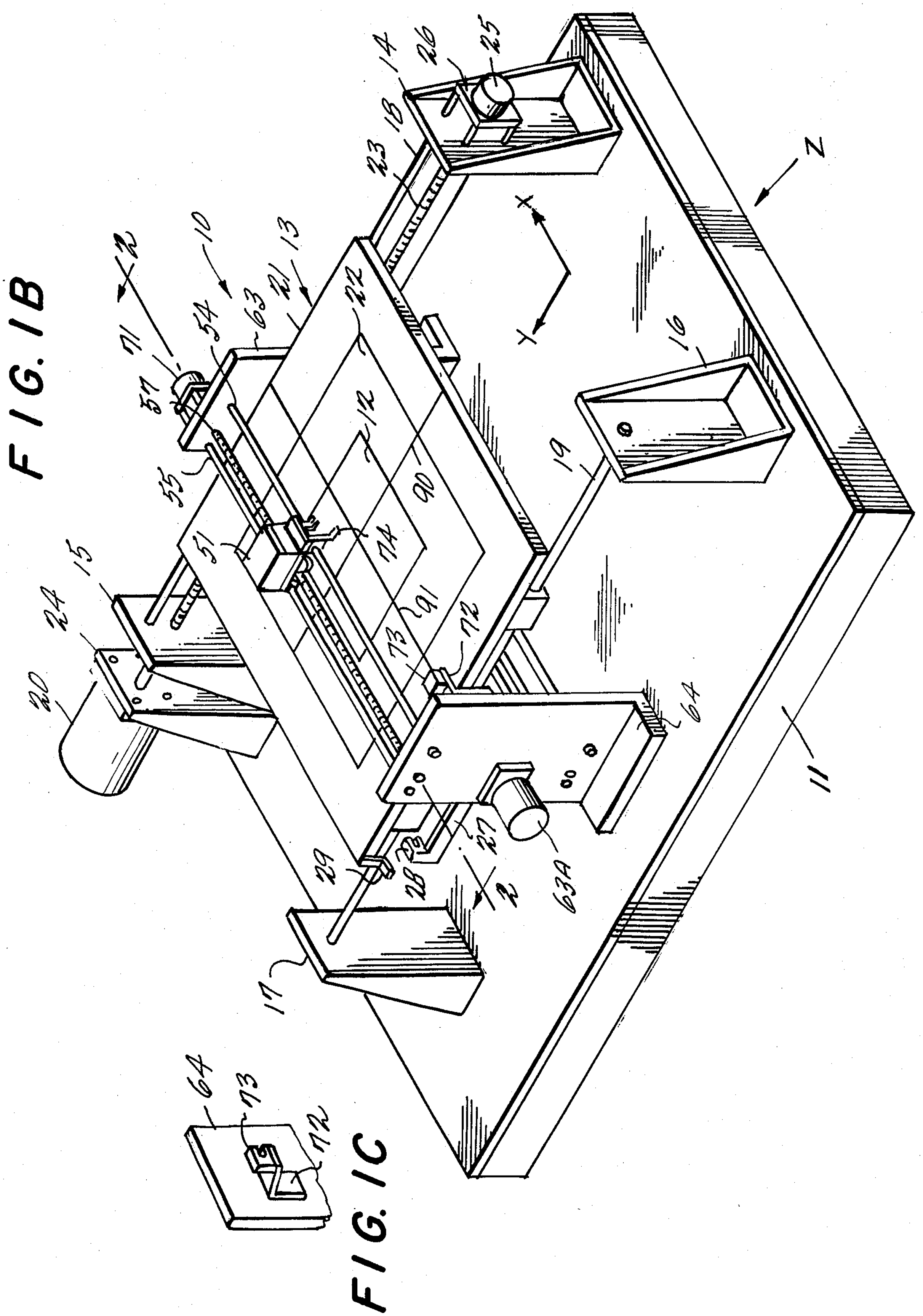
FIG. 1B is a perspective view showing a driving mechanism of pattern area measuring apparatus to be used for practicing the present invention.
FIG. 1C is a perspective view of the origin sensor switch.

One embodiment of the measuring apparatus is shown in FIGS. 1 to 7. Measuring appartus 10 in FIG. 1B is equipped at its lower portion with a base 11, upon which a stage 13 is disposed for receiving thereon a film 12 to be measured. Stage 13 is slidably supported in one axial direction (which will be called an "axis Y"). Stage 13 is constructed of a transparent plate 22, for example, a glass or plastic plate, allowing visible light to be transmitted therethrough and an outer frame 21 bearing transparent plate 22. Stage 13 is also slidably guided by both a guide bar 18 supported by brackets 14 and 15 and a guide bar 19 supported by brackets 16 and 17 in the direction of the axis Y. In brackets 14 and 15, moreover, there is rotatably supported a feed screw 23 which engages with a nut 27 fixed to a lower portion of stage 13. This feed screw 23 has its one end connected through a bearing (not shown) to a motor 20. Numeral 24 indicates a bracket for fixing motor 20. The other end of feed screw 23 is connected to a rotary encoder 25 for detecting the displacement of stage 13. Numeral 26 indicates a bracket for fixing rotary encoder 25 to bracket 14.

With the construction thus far described, stage 13, on which film 12 to be measured is placed, is moved back and forth by motor 20 and feed screw 23, while being guided by guide bars 18 and 19, along axis Y, and its position is detected by rotary encoder 25. Stage 13 has its surface formed with center lines 90 and 91 which make it convenient to place the film to be measured and which have such a width as causes no trouble in the measurements.

The scanning operation in the direction (which will be called an "axis X") perpendicular to the axis Y is effected by moving an optical system 50 which is constructed of a light source unit 52 (see FIG. 3) and a light receiving unit 51. In the present invention, in order that the black area of the film formed with an image to be printed may be measured by transmission, light source unit 52 and light receiving unit 51 are arranged to face each other through aforementioned film 12 and are so constructed that they are moved in synchronization with each other.

Figure 3:
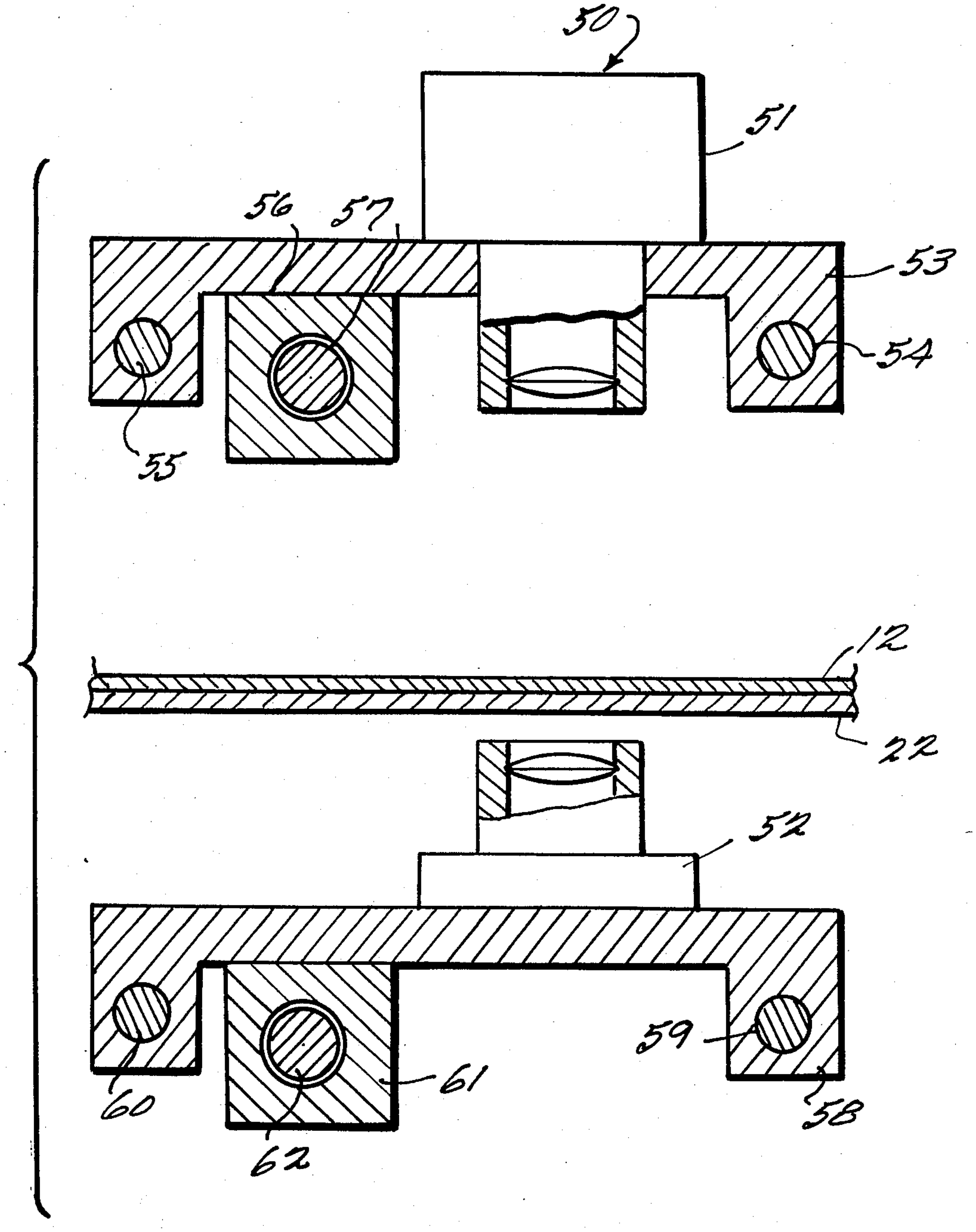
FIG. 3 shows an enlarged sectional view taken along line 3—3 of FIG. 2.

As shown in FIG. 3, light receiving portion 51 (which will be detailed hereinafter) is fixed to an upper carriage 53. This upper carriage 53 is slidably supported by guide bars 54 and 55 and is moved along the axis X by both a nut 56 fixed to a lower portion of upper carriage 53 and a feed screw 57 engaging with nut 56.

Light source unit 52 (which will be detailed hereinafter) is fixed to a lower carriage 58 which is arranged at such a position as to face light receiving unit 51 through stage 13. Lower carriage 58 is slidably supported by guide bars 59 and 60 and is moved in the direction of the axis X by both a nut 61 fixed to a lower portion of lower carriage 58 and a feed screw 62 engaging with nut 61. The leads of feed screws 57 and 62 are preferably made equal.

Those guide bars 54, 55 and 59 and 60 have both their respective ends fixed to brackets 63 and 64. Feed screws 57 and 62 are supported by brackets 63 and 64 so that they are allowed only to rotate.

To bracket 64 is fixed a motor 63A which is interposed between a portion "a" (as shown in FIG. 2), at which upper feed screw 57 begins and a portion b (as shown in FIG. 2), at which lower feed screw 62 begins. Motor 63A has its shaft of rotation (although not shown) connected by a suitable coupling (although not shown) to a drive shaft 64A. On this drive shaft 64A are fixed two pulleys 65 and 66 for timing belts. To shaft portion 57A of feed screw 57 at the left hand side is fixed a pulley 67 for a timing belt, which is positioned to face pulley 65. To a shaft portion 68A of feed screw 62 at the lefthand side (i.e., at the side of the bracket 64), moreover is fixed a pulley 68 for a timing belt, which is positioned to face pulley 66. Pulleys 65, 66, 67 and 68 are so fixed to their respective shafts by suitable means such as keys or pins that they can rotate integrally with the shaft they engage. Pulleys 65, 66, 67 and 68 are so selected that they have an identical circular pitch. Moreover, pulleys 65 and 66 are so selected that they have an identical pitch diameter and pulleys 67 and 68 are so selected that they have identical pitch diameter. For the pulleys thus selected, a timing belt 69 is made to run on pulleys 65 and 67, whereas a timing belt 70 is made to run on pulleys 66 and 68.

By the construction thus far described, the rotations of the motor are transmitted equally to feed screws 57 and 62. Since feed screws 57 and 62 are made to have an identical lead, carriages 53 and 58 and, accordingly, light receiving unit 51 and light source unit 52, are moved in complete synchronism with each other. Moreover, the movement of optical system 50 constructed of light receiving unit 51 and light source unit 52 is detected by means of a rotary encoder 71 which is connected to the righthand end of feed screw 57 through a bearing (although not shown).

In measuring apparatus 10 of the present invention, moreover, in order to make it convenient to indicate positions on axes X and Y, the origins of axes X and Y are determined at positions where optical system 50 and stage 13 are located at the lefthand side and at this side, respectively, when observation is made in the direction of an direction Z as shown in FIG. 1B. The origin of axis X is detected when a dog 74 fixed to the lower face of light receiving unit 54 crosses a noncontact switch 73 (FIGS. 1C and 1D) fixed to the inner side face of bracket 64 through a sensor mounting plate 72. The origin of axis Y is detected when a dog 29 fixed to the lefthand side face of stage 13 crosses a noncontact switch 28 fixed to the inner side face of bracket 64 through sensor mounting plate 72. In response to the output signals of switches 73 and 28, the motors 63A and 20 are stopped.

Figure 8:
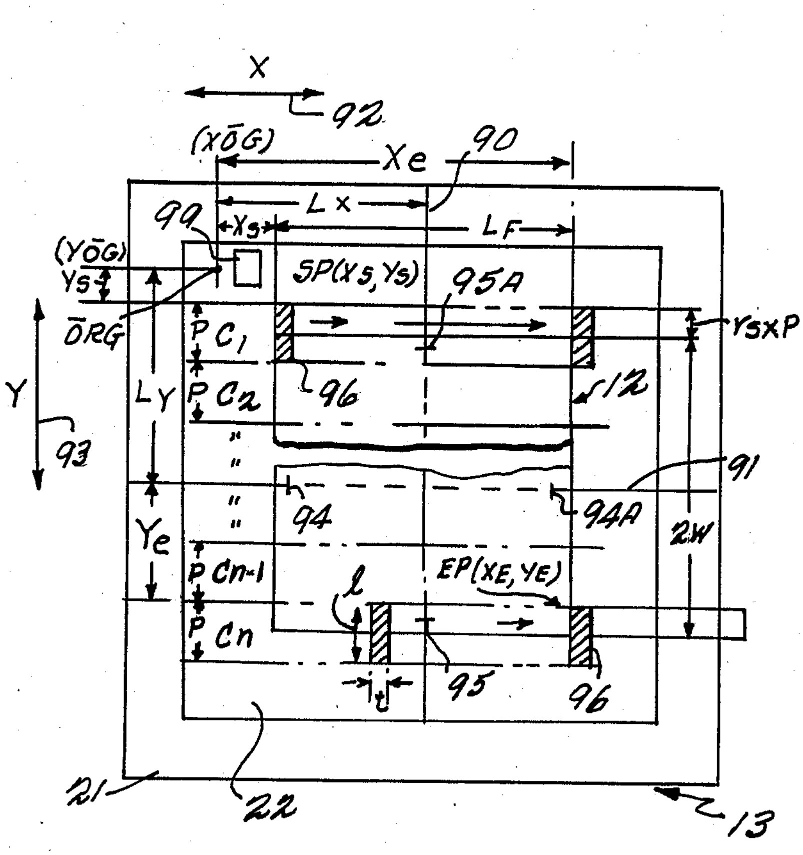
FIG. 8 is a diagram showing the relative positions of the film and the slit arranged on the transparent plate of the measuring apparatus.

Measuring apparatus 10 having the construction thus far described is charged with film 12 to be measured in the following manner. Specifically, as shown in FIG. 8, film 12 to be measured has its top and bottom direction 92 and its widthwise direction 93 arranged in the axes X and Y, respectively. Moreover, register marks 94 and 94A at a widthwise center portion of film 12 are aligned with a center line 91 which is arranged in the center of the direction of axis Y of stage 13. Resister marks 95 and 95A at the center portion of film 12 in the top and bottom direction are aligned with center line 90 which is arranged in the center of the direction of axis X of stage 13.

In the present invention, film placed in the aforementioned manner has its pattern area of one of divided columns ($C_1$, $C_2$, . . . , and $C_n$) measured in one stroke by the use of a narrow measurement spot 96 has finished its movement from the left end to the right end of film 12, stage 13 is fed one column downwardly of the drawing by motor 20 so that the measurement of the column $C_2$ is started again from the lefthand end of film 12 and ended at the righthand end of film 12. These are repeated so that the total area of the film is scanned. Measurement spot 96 has its width "t" determined arbitrarily by the measurement precision required.

Figure 4:
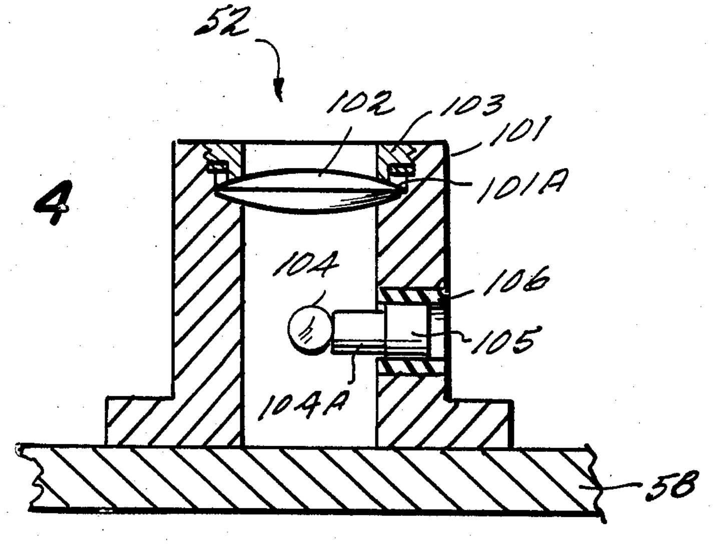
FIG. 4 is an enlarged detail sectional view of the light emitting unit shown in FIG. 3.

In order to form measurement spot 96 into the aforementioned shape, optical system 50 is made to have the following construction. The construction of a light source unit 52 is shown in FIG. 4. A lamp housing 101 is fixed to an upper portion of lower carriage 58. Lamp housing 101 has its center end portion formed with a stepped hole 101A which mounts a lens 102 fixed by a retaining nut 103. Below lens 102 is arranged a lamp 104 connected to a socket 104A which is fixed in lamp housing 101 through a lamp holder 105 and an insulating member 106. Lamp holder 105 is fixed to lamp housing 101 by a push screw (not shown) which is mounted in the outer circumference of lamp house 101. The size of the lens is so selected that the surface of the film to be measured can be illuminated with a circular spot as has a diameter larger than a width of the column. If necessary, moreover, a diffusion plate made of frosted glass may be mounted around lens 102 so as to eliminate irregularity in the illumination.

Figure 5:
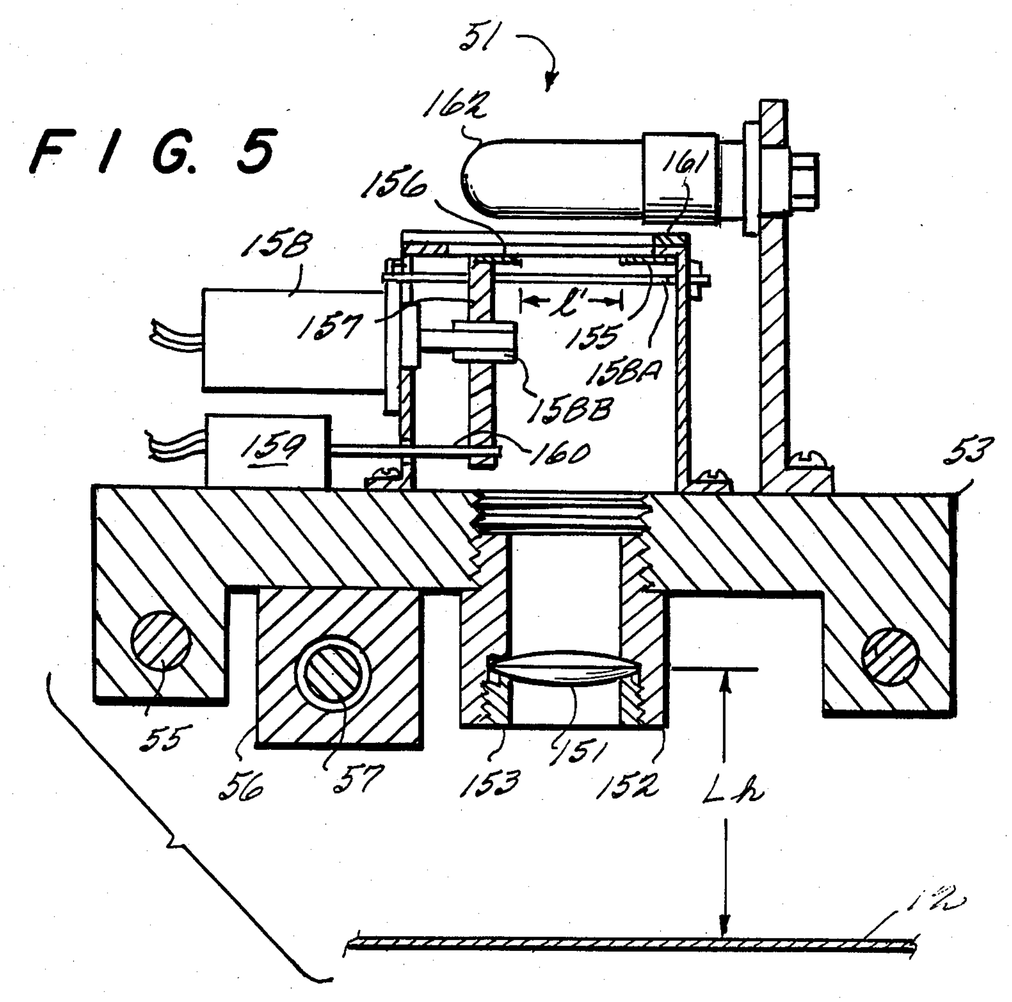
FIG. 5 is an enlarged detail sectional view in the light receiving unit shown in FIG. 3.

The construction of light receiving unit 51 is shown in FIG. 5. On the lower face of upper carriage 53 is screwed a lens holder 152 for holding therein a condensing lens 151 for condensing the light transmitted passed through film 12 to be measured. Lens 151 is fixed in lens holder 152 by means of a nut 153.

Figure 6:
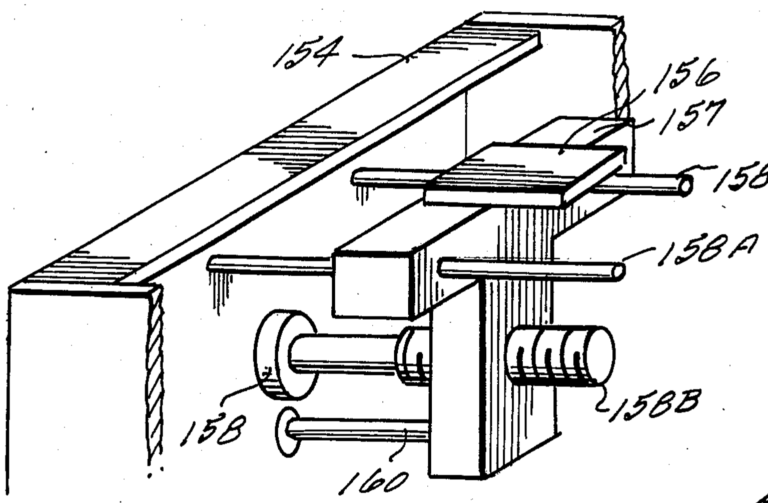
FIG. 6 is a detail view in the vicinity of movable member constructing a slit shown in FIG. 5.

On the upper face of upper carriage 53 are arranged a slit for regulating the measurement spot, a photoelectric converter and so on. The length of the measurement spot is regulated by both a stationary slit member 155 and a movable slit member 156, which are built in a housing 154 as shown in FIG. 6. Stationary slit member 155 is fixed to housing 154. While movable slit member 156 is fixed to a movable member 157. This movable member 157 is slidably supported by two guide bars 158A, which are fixed in parallel to housing 154.

Since the width of the columns to be set on film 12 to be measured is different for different printers, it is desirable that the length of the measurement spot be variable. According to the construction of the present invention, since the length of the measurement spot is automatically set by the command of a control device, the position of movable member 157 having movable slit member 156 is controlled by the control device. By making the externally threaded portion 158B, which is formed in the shaft end of motor 158 fixed to the outer wall side of housing 154, engage with the internally threaded portion which is formed at a center portion of movable member 157, more specifically, this movable member 157 is linearly moved by motor 158 while being guided by guide bar 158A. To the lower end of movable member 157, moreover is fixed one end of a rod 160 of a linear type potentiometer 159 which is fixed to the upper face of upper carriage 53 so that the position of movable member 157 is indicated by that potentiometer 159. Stationary and movable slit members 155 and 156 are preferably arranged at the focal point of condensing lens 151.

Figure 7:
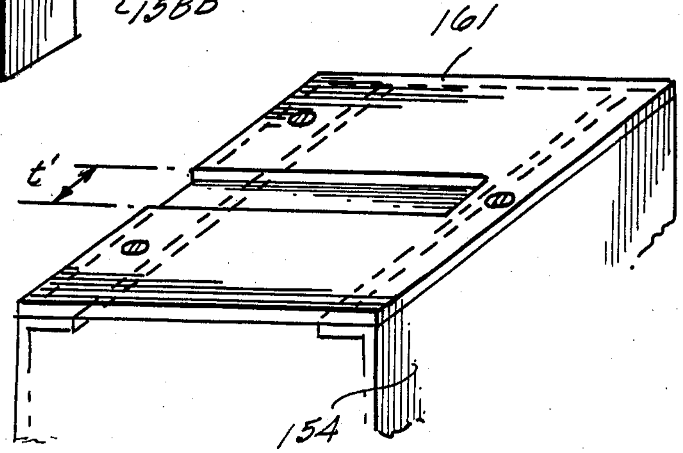
FIG. 7 is a view showing the arrangement of a member determining the width of the slit.

Further, the width "t" of the measurement spot is regulated, as shown in FIG. 7, by a slit member 161 which is formed at its center portion with a slit having a width t'. That slit member 161 is fixed to the upper face of housing 154.

Thus, the light, which has passed through such a gap as is formed by stationary slit member 155, movable slit member 156 and slit member 161 and as has a rectangular cross-section, is converted into an electric signal by a photoelectrically converting element 162. Although, in the embodiment being described, a photomultiplier tube is exemplified as the photoelectrically converting element, it is also possible to use a photoelectrically converting element of semiconductor type (e.g., a silicon photodiode).

However, the gap l' between stationary and movable slit members 155 and 156, and the length l of the measurement spot are neither always equal nor are the slit width t' of slit member 161 and the width t of the measurement spot. The reasons therefor are as follows. The size of the photoelectric surface of the side-on type photomultiplier tube, as is exemplified in the present embodiment, is usually 24 mm×8 mm at the largest. The width of the columns set on film 12 to be measured usually ranges from 25 mm to 42 mm although it differs in accordance with the particular printing machine. Therefore, the length l of measurement spot 96 is required to have a size ranging from 25 mm to 42 mm. In order to receive all the surface of the measurement spot on the photoelectric surface of photomultiplier tube 162, therefore, it is necessary to construct optical system 51 so that measurement spot 96 may be received in a reduced scale. For this necessity, according to the present invention, the focal distance of condensing lens 151 of optical system 51 shown in FIG. 5 and the length $L_h$ from film 12 to be measured to condensing lens 151 are so selected as to attain such a reduction ratio, for example, that the maximum length $l_{max}$ (e.g., $l_{max}=42$ mm) of measurement spot 96 may be within the length 24 mm of the photoelectric surface of photomultiplier tube 162. If the reduction ratio is $\frac{1}{4}$, for example, therefore, it is sufficient that the gap l' can vary within a range of 6.25 mm to 10.5 mm for the varying range of the length l from 25 mm to 42 mm. At this time, the slit width t' of slit member 61 is naturally selected $\frac{1}{4}$ of the width t of the measurement spot is a value relating to the resolution of the measurement. Although the measurement precision is improved if that value t is made small, the time period required for one column to be measured is proportionally elongated. Therefore, a suitable value is selected by considering both the measurement precision required and the time period allowed for the measurement.

Figure 9:
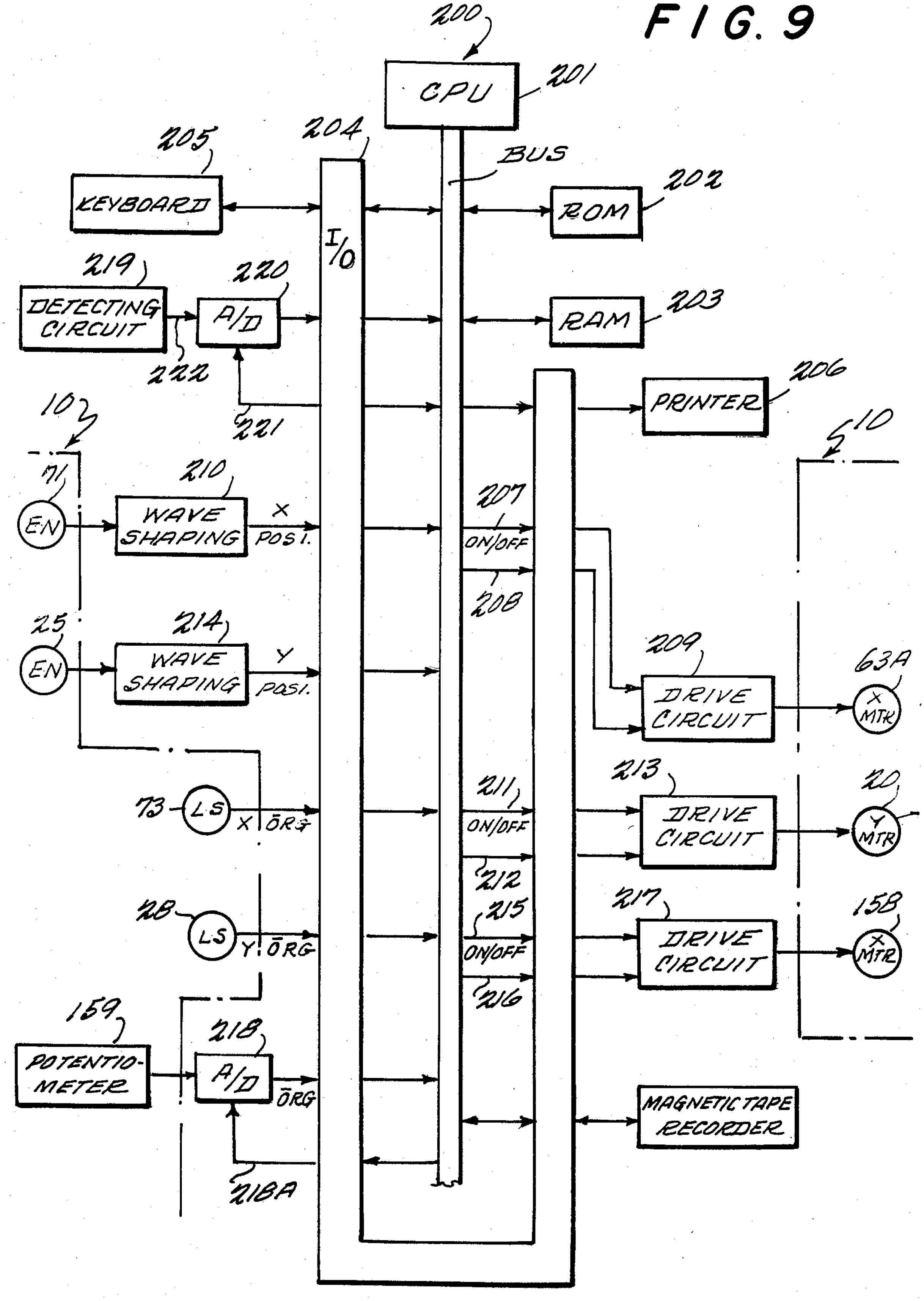
FIG. 9 is a control block diagram of the measuring device adopting a computer system.

Referring to FIG. 9 a control device 200 is a microcomputer system which is composed of: a microprocessor (which will be hereafter called a "CPU") 201; a ROM (i.e., a read only memory) 202 acting as a memory device; an RAM (i.e., a random access memory) 203 acting as a memory device; and an I/O device 204 for controlling the input from and the output to an external device. In ROM 202 are stored both the procedures for operating measuring apparatus 10 in accordance with a predetermined order and the procedures for arithmetically processing the signals which are obtained by optically scanning film 12 to be measured. Moreover, both the numerical values necessary for determining the operations of measuring apparatus 10 and the numerical values necessary for arithmetically processing the measured data are fed in from a key board 205, and the arithmetically processed result of the measured data is fed out of a printer 206. Key board 205 is equipped in addition to the key switches for the input with lamps or the like for displaying the operating states of measuring apparatus 10 and control device 200.

In order to move optical system 50, motor 63A is controlled by a drive circuit 209 which is operated in accordance with the commands (at lines 207 and 208) from CPU 201. Numeral 207 indicates a signal relating to the moving direction. The signal of rotary encoder 71 for detecting the movement of optical system 50 is fed through a wave shaping circuit 210 to CPU 201 but becomes a signal relating to the control of the motor 63A. Likewise, motor 20 for moving stage 13 in the Y direction is controlled by a drive circuit 213 which is operated on the basis of the commands (at lines 211 and 212) from CPU 201. Numeral 211 indicates a signal relating to start/stop, and numeral 212 a line carrying a signal relating to the moving direction. The output of rotary encoder 25 is fed as a printing output to printer 206 through a wave shaping circuit 214.

In order to move optical system 50, stage 13 and variable slit member 156, the motors 63A, 20 and 158 are controlled by drive circuits 209, 213 and 217 which are operated on the basis of the commands of CPU 201, respectively. Lines 207, 211 and 215 are signal lines relating to start/stop. Lines 208, 212 and 216 are signal lines relating to the moving directions. The output signals of rotary encoders 71 and 25 for detecting the movements of optical system 50 and stage 13 are fed to wave shaping circuits 210 and 214, respectively, and further to CPU 201 through I/O device 204 to produce signals controlling motors 63A and 20. The output of potentiometer 159 for detecting the position of movable slit member 156 is converted by an AD converter 218 and is then fed to CPU 201 through I/O device 204 to produce a signal controlling of motor 158.

The respective outputs of both the noncontact switch 28 for locating the initial position of stage 13 and noncontact switch 73 for locating the initial position of optical system 50 are fed through I/O device 204 to CPU 201 until they become signals for effecting returns to the initial position.

A detecting circuit 219 for attaining a voltage corresponding to the area of the image visible in the surface of film 12 to be measured is constructed, as shown in FIG. 10, of: photomultiplier tube 162; a DC high voltage source 223 for impressing a high voltage upon that photomultiplier tube 162; a current-voltage converting circuit 224 for converting the photocurrent of photomultiplier tube 162 into a voltage; and an amplifier 225 for amplifying the output of DC current-voltage converter circuit 224 to a desired level. More specifically, the current-voltage converter 224 is composed of an operational amplifier OP1 and a fixed resistor R1, and amplifier 225 is composed of an operational amplifier OP2, fixed resistors R2 and R3, and a variable resistor VR for variably setting the degree of amplification of amplifier 225.

The output 222 of detecting circuit 219 is converted at an A/D converter 220 into a digital value, which is fed through I/O device 204 to CPU 201. CPU 201 applies the signal to printer 206 after it has been arithemetically processed, as necessary.

Control device 200 thus far described is covered with the cover (although not shown) of the measuring apparatus, and especially key board 205 and printer 206 are disposed at such places as are suitable for their operations.

The following description is directed to the method for calculating the pattern area percentage for the printing plate as a whole by means of the pattern area percentage measuring apparatus having the construction thus far described.

Figure 12:
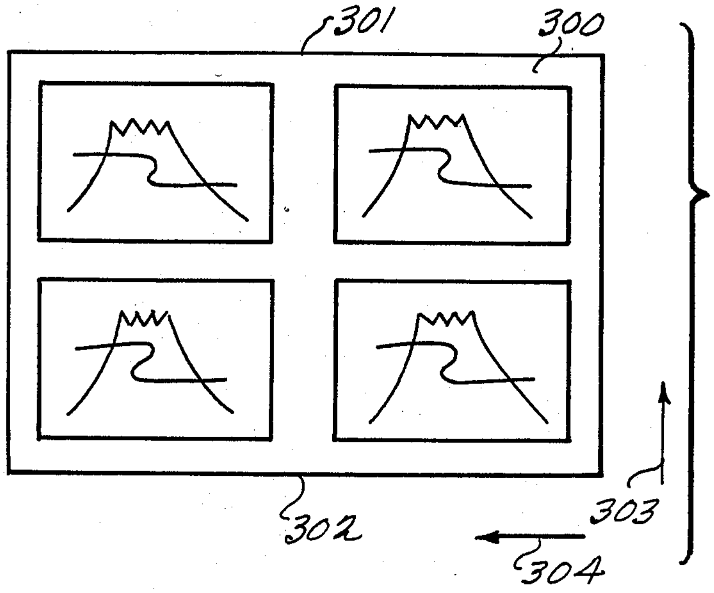
FIG. 12 is a diagram showing identical films arranged on the printing plate.

Now, the operations of the present invention will be described by taking the printing plate, which is so laid out as is shown in FIG. 11, as one example of the printing plate which is prepared by the multi-printing process and by taking, as an example, the method for calculating the pattern area percentage of each of the columns which are divided in advance for that printing plate. The printing plate to be multi-printed is generally constructed such that identical films are regularly arranged in the top and bottom direction and in the right and left direction, as shown in FIG. 12. In order to clarify the effects of the present invention, however, the description under consideration takes, as an example, the case in which films having arbitrary sizes are printed at irregular intervals, as shown in FIG. 11.

In order to classify a plurality of films, specific recognition numbers are assigned to the respective films in a manner to correspond to the positions where they are laid out. This assigning method is shown in FIG. 11, in which numeral 301 indicates a trailing or leading end of a printing plate 300, which is to be pinched, in accordance with the surface or back printing case and 301 the leading or trailing of printing plate 300. More specifically, the positions in which register marks 94 formed at the centers of the respective films are laid out are consecutively named at 1st, 2nd, . . . , and mth rows from the lefthand side of printing plate 300. In case a plurality of films are laid out in one row, on the other hand, their positions are consecutively numbered at 1st, 2nd, . . . , and nth steps from the uppermost step 301. Thus, for example, tne respective films are numbered at the recognition numbers such that the film to be laid out at the 1st step of the 1st row is indicated at $F_{11}$, such that the film to be laid out at the 2nd step of the 1st row is indicated at $F_{12}$ and so on. In a more general expression, each film is indicated at a recognition number $F_{ik}$ (wherein: letter i stands for 1, 2, 3, . . . , and m; and letter k stands for 1, 2, 3, . . . , and n).

Figure 13:
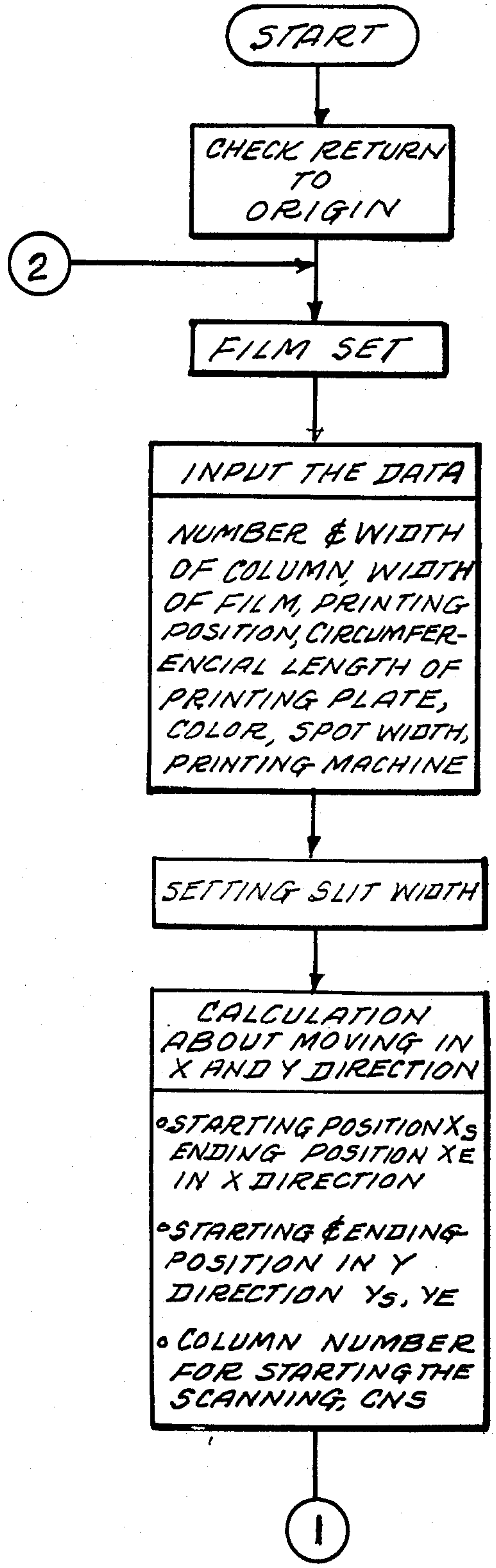
FIGS. 13 and 14 are flow charts showing the conceptional processes of measurements.
Figure 14:
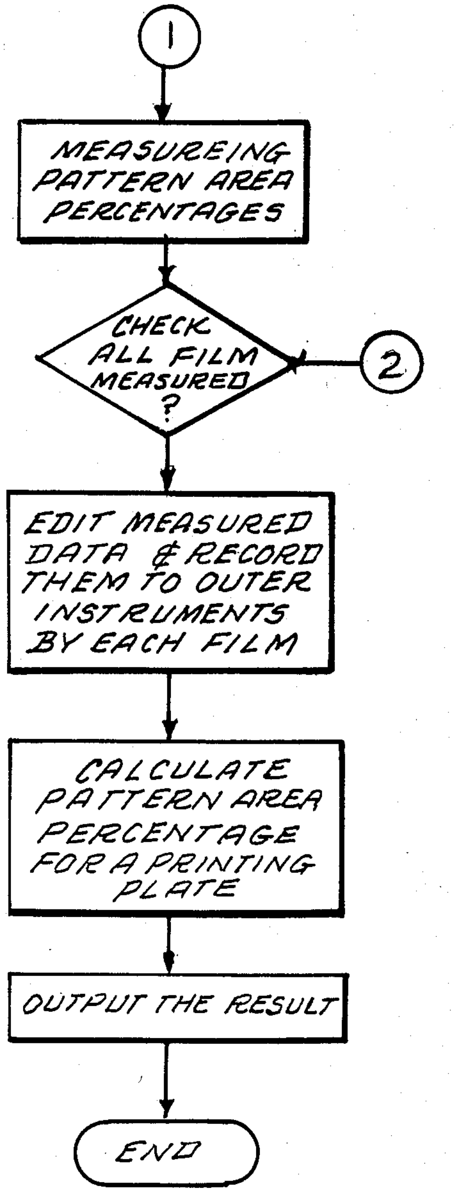

FIGS. 13 and 14 are flow charts illustrating the procedures of calculating the pattern area percentages in accordance with the present invention. In accordance with these procedures, the operation of the apparatus having the construction thus far described and the method of measuring the pattern area percentages by the use of that apparatus will now be described.

Step 1 (350): When a main switch is turned on, predetermined electric power is supplied to control device 200, light source 104, noncontact switches 73 and 28, rotary encoders 71 and 25, potentiometer 159 and so on.

Step 2 (351): Whether or not stage 13 and optical system 50 are positioned at their initial position is confirmed. If so, noncontact switches 28 and 73 for detecting the initial position are conducting, and their signals are fed to CPU 201 so that they are lit and displayed on key board 205.

Step 3 (352): As shown in FIG. 8, film 12 is fixed by means of an adhesive tape after it has had its register marks 94 and 94A in the top and bottom direction aligned with center line 91 of stage 13 in the direction of axis X and its register marks 95 and 95A in the right and left direction of axis Y. Thus, register mark 94 is the mark at the top side of the film, whereas register mark 94A is the mark at the bottom side. Therefore, register mark 95 is the register mark at the lefthand side of film 12, whereas register mark 95A is the register mark at the righthand side.

Step 4 (353): A group of data such as the number of the printing machine, the discrimination of the surface or back printing operation, the number N of the ink adjusting keys, the spacing P of the same keys, the width 2W of the film to be measured, the layout position L of the same film, the film recognition number (which is the number $F_{mn}$, as has been described with reference to FIG. 11), the length $L_F$ of the film in the top and bottom direction, the circumferencial length $L_a$ of the printing drum, the width t of the measurement spot, and the kind of the color are fed through key board 205.

Step 5 (354): When the switch disposed in key board 205 for setting the slit width for the light transmission measurement is pushed, a signal is generated at a line 218A of FIG. 9, and the output of potentiometer 159 for locating the present position of movable slit member 156 is converted into a digital quantity by A/D converter 218 and is fed to CPU 201. This value is compared with the value, which is the multiplication of the spacing (which is indicated at t) of the ink adjusting keys, which has been fed at step 4, and the reduction ratio of lens 151 of light receiving unit 51, so that signals are generated at lines 215 and 216 in accordance with the compared difference thereby to adjust the position of movable slit member 156, i.e., the slit width l' (as shown in FIG. 5).

Step 6 (355): The starting and ending positions of the measurements for stage 13 and optical system 50 are calculated. In addition, the number of the columns to be laid out on the printing plate in the respective column rows, is calculated and which are determined on the film to be measured by the calculations at the present step (which will be detailed hereinafter) calculated. The calculations at present step 6 (355) are automatically calculated, when the key for starting the calculations is pushed, on the basis of the input data. The calculating procedures are stored in ROM 202.

The measurement starting and ending positions $X_S$ and $X_E$ of optical system 50 are given by Equations of $X_S=L_X-(L_F/2)$ and $X_E=L_X+(L_F/2)$ if the distance from center 90 of stage 13 to the origin of optical system 50 is designated at $L_X$ and if that length of the film in the top and bottom direction, which is fed at step 4 (353), is designated at $L_F$.

Moreover, if the measurement starting position relating to stage 13 in the direction of axis Y is designated at $Y_S$, if the measurement ending position relating to the same is designated at $Y_E$, and if the number, by which the respective columns (i.e., $C_1$, $C_2$, . . . , and $C_n$ of FIG. 8) set on film 12 by the calculations are made to correspond to a column number 404 (which will be detailed hereinafter) regulated in advance on printing plate 300, is designated at CN, the methods of calculating those $Y_S$, $Y_E$ and CN will now be described with reference to FIGS. 8 and 18.

Figure 18:
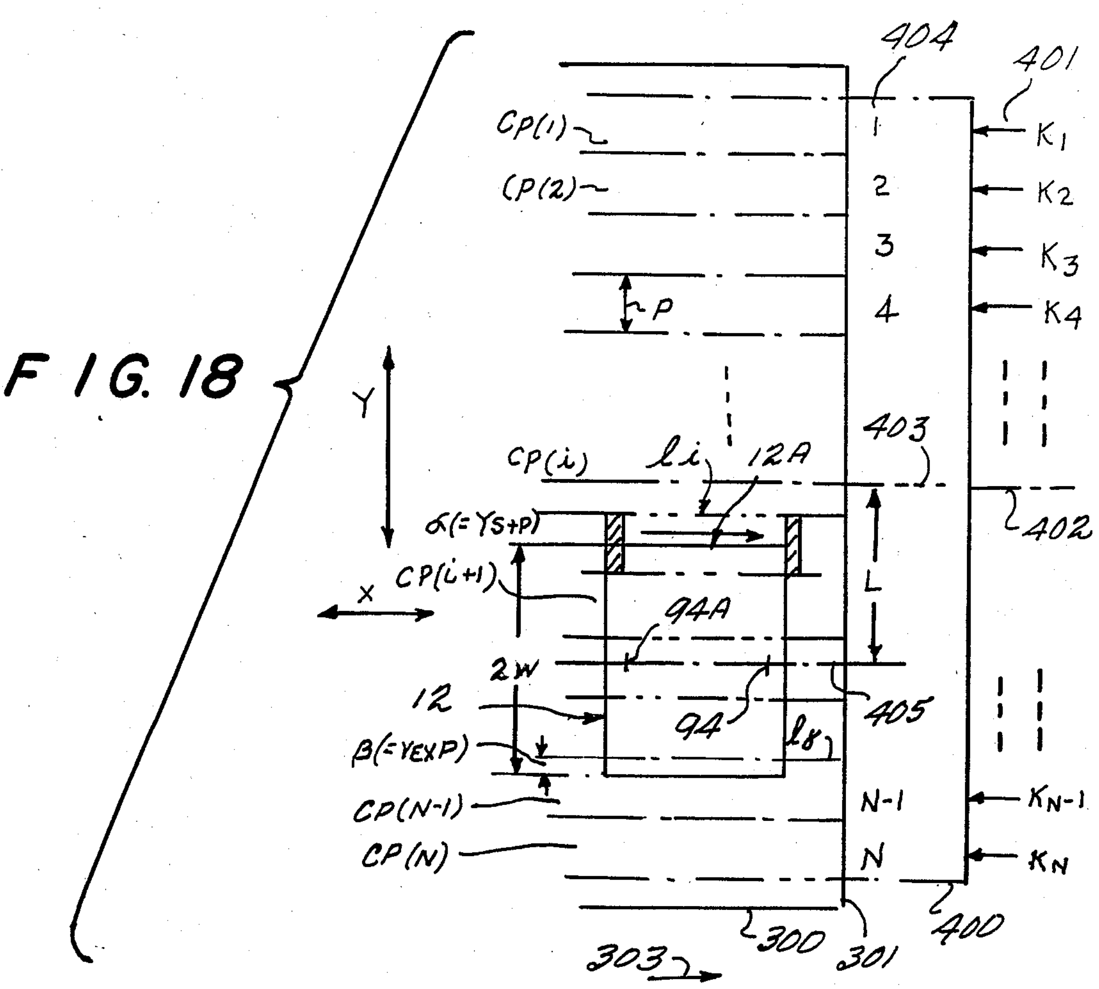
FIG. 18 is a diagram illustrating the state at which film shown in FIG. 8 is arranged on the printing plate.

In FIG. 18, numerals 400 and 401 conceptionally indicate an ink reservoir of the printing machine and a plurality of ink adjusting keys which are equidistantly arranged in that ink reservoir, respectively. Numerals 402 and 403 indicate the center position of aforementioned ink reservoir 400 and the center position of printing plate 300, respectively.

The columns CP(1), CP(2), . . . , and CP(N) on printing plate 300 are so regulated that ink adjusting keys 401 are positioned, when center 402 of ink reservoir 400 and center 403 of printing plate 300 are aligned, at the aligned center. Therefore, the column width P on the printing plate is equal to the spacing of the ink adjusting keys, and the number of those columns is equal to the number of the ink adjusting keys. In the present embodiment, moreover, the respective column rows are designated, as shown in FIG. 18, at 1, 2, 3, . . . , N (404) in the consecutive order from the lefthand side when printing plate 300 is placed in a manner that its pinched trailing end 301 is positioned at the top side.

Now, the number of ink adjusting keys 401, which is fed at step 4 (353), is designated at N, the spacing of the identical keys 401 is designated at P, the width of film 12 to be measured is designated at 2W, and the layout position of same film 12 is designated at L. The value L of the layout position of the present embodiment is the distance between center 405 of film 12 and center 403 of printing plate 300, and the value L is positive, when center 405 of film 12 is positioned at the righthand side of center 403 of printing plate 300, as viewed in FIG. 18, whereas it is negative in the reverse case. At this time, the positions $Y_S$ and $Y_E$ are given by the following Equations, if reference is made to FIG. 8:

$$Y_S=L_Y-(r_S\times P+W) \quad (1);$$

and $$Y_E=L_Y-(r_E\times P-W) \quad (2).$$

For the number CN, on the other hand, if the value (which is designated at $CN_S$) for the 1st column $C_1$ (as shown in FIG. 8) which is set on the film to be measured by the calculations is known, the subsequent columns are determined by adding a by one each time the column rows are measured. Then, the number $CN_S$ is given by the following Equation:

$$CN_S=N_S+1 \quad (3).$$

Here, the values $N_S$ and $r_S$ appearing in the Equations (1), (2) and (3) are the interger and decimal parts of the value $l_S$ which will be calculated by the following Equation (4), respectively:

$$l_S=(N/2)+(L-W)/P \quad (4).$$

Moreover, the value $r_E$ is the decimal part of the value $l_E$ which is calculated by the following Equation (5):

$$r_E=(N/2)+(L+W)/P \quad (5).$$

The meaning of step 6 (355) thus far described will be summarized in the following. In order that the positional relationships between film 12 and respective columns CP(1), CP(2), . . . , and CP(N), as shown in FIG. 18, may be maintained even when the register marks 94, 94A, 95 and 95A of same film 12 are arranged on stage 13 (as shown in FIG. 8) acting as the measuring device in alignment with lines 91 and 90, the scan starting position SP ($X_S$, $Y_S$) and the scan ending position EP ($X_E$, $Y_E$) of slit 96 are determined such that columns CP(i), CP(i+1) and so on of FIG. 18, for example, correspond to columns C1, C2 and so on, respectively.

The lefthand side members $l_S$ and $l_E$ of the Equations (4) and (5) are defined as follows:

$l_S$: In FIG. 18, the number i of the column (which is indicated at CP(i) in the same Figure), to which the upper edge 12A of film 12 belongs, corresponds to the integer part of the value $l_S$, and the decimal portion $r_S$ of the same expresses the ratio of the distance $\alpha$ between upper edge 12A and a line $l_i$ to the width P of one column, as shown, so that the distance $\alpha$ is expressed by $\alpha=r_S\times P$; and $l_E$: In FIG. 18, the number (N-1) of the column (CP(N-1)), to which lower edge 12B of film 12 belongs, correspond to the integer part of the value $l_E$, and the decimal part of the same expresses the ratio of the distance $\beta$ between lower edge 12B and line $l_j$ to the width P of one column so that the distance $\beta$ is expressed by $\beta=r_E\times P$.

Figure 15:
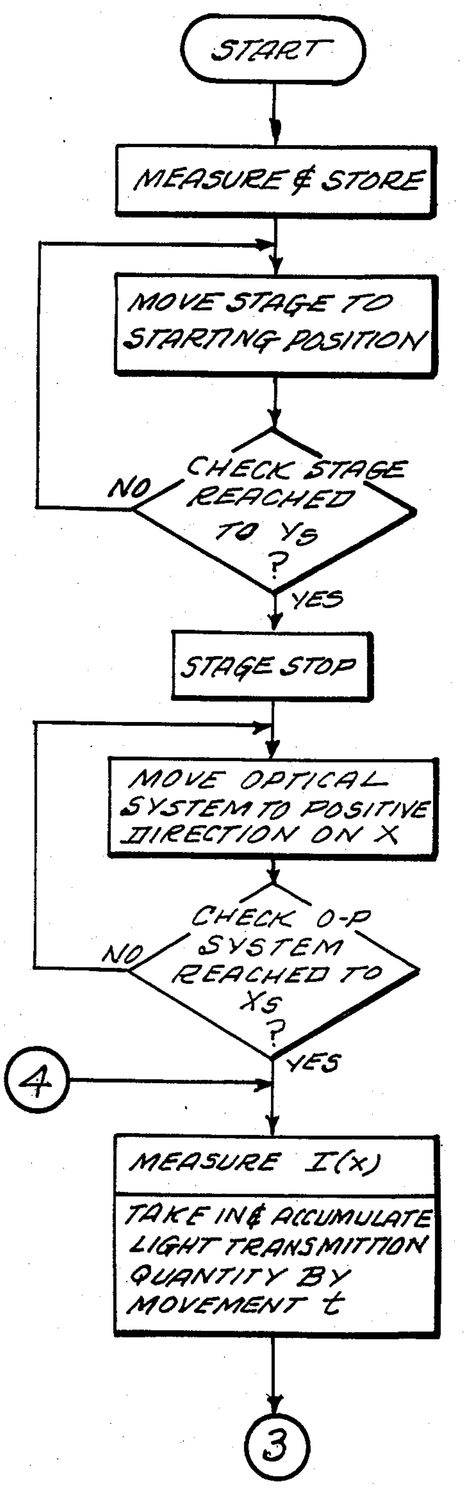
FIGS. 15, 16 and 17 are more detail flow charts of step 356 in FIG. 14.
Figure 16:
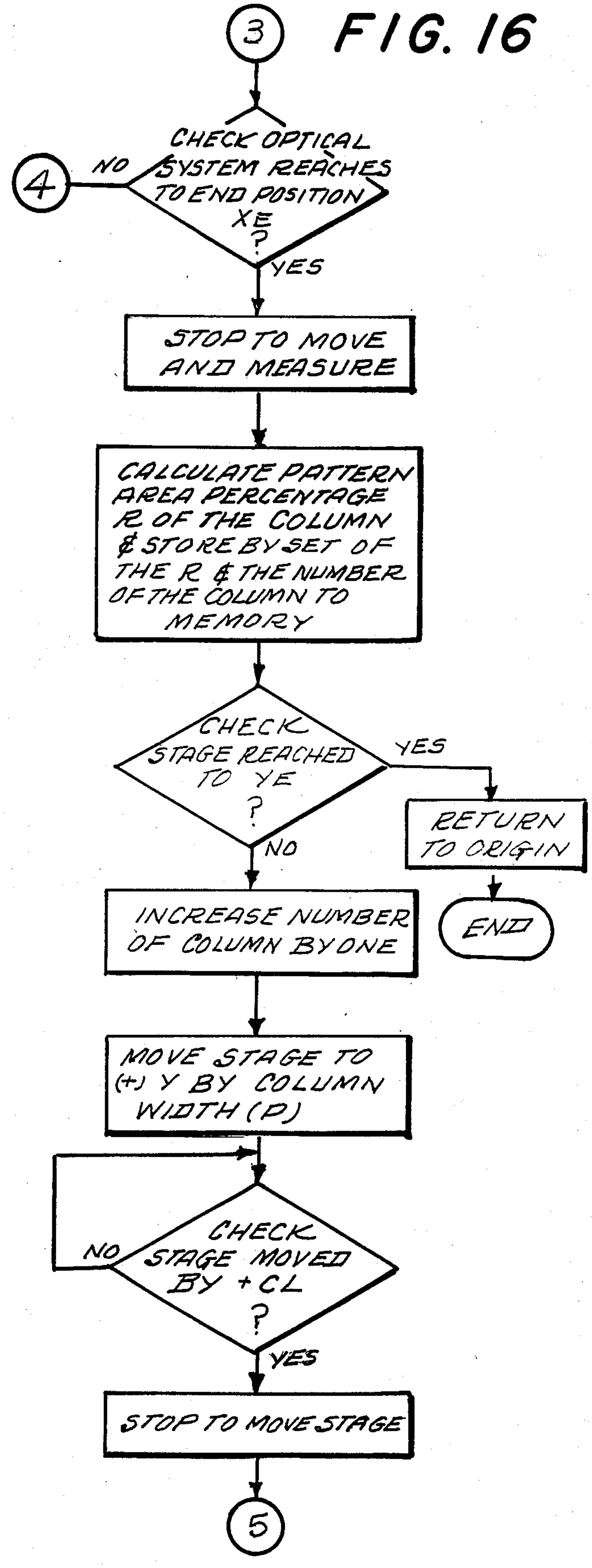
Figure 17:
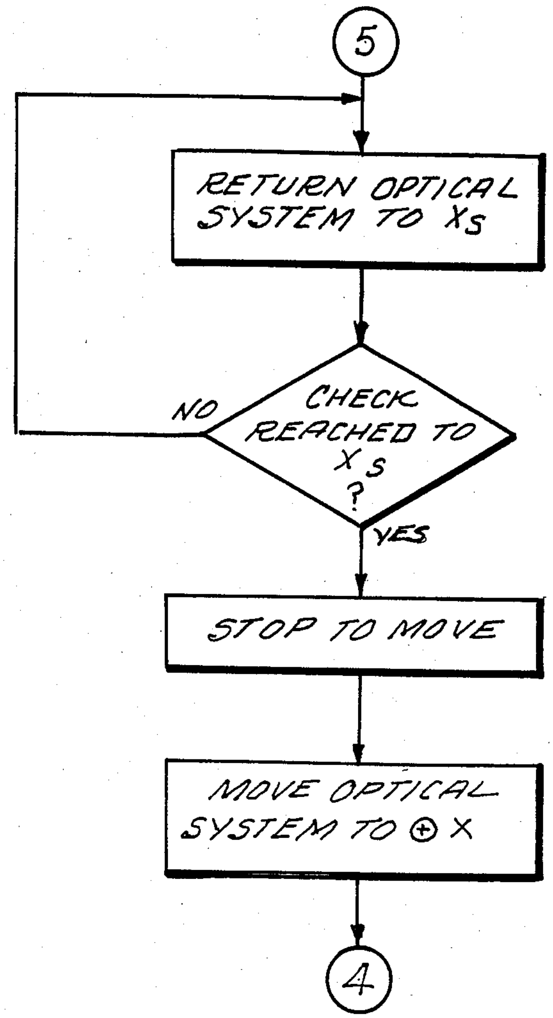

Step 7 (356): The pattern area percentages of film 12 to be measured are calculated while controlling measuring apparatus 10 on the basis of the numerical values calculated at step 6 (355). One embodiment of the calculating operations is shown in FIGS. 15, 16 and 17.

When the measurement starting button is pushed (at the STP 1), the signal for starting the A/D conversion is first generated at line 221 of control device 200, and the measured values of the light transmissions through the non-black portions of film 12 are fed, after they are converted from analog to digital by A/D converter 220, to CPU 201 until they are stored in RAM 203 (at STP 2). For this purpose, an unexposed film sample 99 (as shown in FIG. 8), for example, which has a larger area than the measurement spot (as shown in FIG. 8), is adhered in advance to transparent plate 22 at a position corresponding to the origin of optical system 50. Next, the signal corresponding to ON is generated at line 211 of control device 200, and the signal corresponding to the movement of stage 13 in the "+" direction is generated at line 212. In response to those signals, drive circuit 213 is operated to energize stage driving motor 20 so that stage 13 is started to move (at STP 3). The movement of stage 13 in the direction of axis Y is detected by rotary encoder 25, and the detected signal is fed, after its wave has been shaped by wave shaping circuit 214, to CPU 201 so that it is compared (at the STP 4) with the value $Y_S$ which is calculated in advance at step 6 (355). If coincidence takes place inbetween, the signals of lines 215 and 216 disappear to stop Y-axis drive motor 20 (at STP 5).

Next, in order to determine the position of the origin on the axis X, signals are generated at lines 207 and 208 of control device 200. Specifically, the signals corresponding to ON and to the movement of optical system 50 in the "+" direction are generated at lines 207 and 208, respectively. In response to those signals, drive circuit 209 is operated to energize optical system driving motor 63A so that optical system 50 is started to move in the "+" direction (at STP 6). The movement of optical system 50 is detected by rotary encoder 71, and the detected signal is fed, after its shape has been shaped by wave shaping circuit 210, to CPU 201. When the movement of optical system 50 reaches the value $X_S$ which has been calculated at step 6 (355) (at STP 7), the signal for starting the A/D conversion is generated at line 221 of control device 200 so that the measurements of the transmissions of the pattern portions of film 12 are started (at STP 8). At this time, the signal of line 221 is generated each time optical system 50 is moved the measurement spot width t (e.g., 1 mm) fed at step 4 (353), and the measured data from the detecting circuit 219 are fed in synchronism with that signal to CPU 201 and are stored in RAM 203.

When optical system 50 is further moved on axis X in the "+" direction until its movement reaches the value $X_E$ which has been calculated at step 6 (355) (at STP 9), the signals disappear from lines 207, 208 and 221 of control device 200 so that the measurements of the light transmissions are stopped simultaneously with the stop of the movement of the optical system (at the STP 10).

Then, the pattern area percentages of the measured columns are calculated (at STP 11) from the measured results of step 8. If the length of the film in the top and bottom direction, which is fed at step 4 (353), is designated at $L_F$ and if the value of the width of the measurement spot is designated at t (as shown in FIG. 8), the pattern area percentage R of each of the aforementioned columns is expressed by the following Equation (6) for the positive film and by the following Equation (7) for the negative film:

$$\left[1-\sum_{j=1}^{n_1} I_{Sj}/(n_1\times I_0)\right]\times 100\% \quad (6)$$

$$R=\left[\sum_{j=1}^{n_1} I_{Sj}/(n_1\times I_0)\right]\times 100\%. \quad (7)$$

Here, letters $I_{Sj}$ designate the measured data of the light transmissions which are read in each time optical system 50 is moved the distance t (as shown in FIG. 19), and letters $I_O$ designate the light transmissions of the unexposed portions of the film, which were measured at step STP 2. Moreover, an Equation of $n_1=L_F/t$ holds. The values R of the pattern area percentages, which are calculated from the Equations (6) and (7) are stored in RAM 203 while being grouped together with the column numbers CN corresponding thereto.

Then, each column number is increased one from the present value thereby to determine the number of the column to be measured next (at STP 12). Then, the signals are generated again at lines 211 and 212 of control device 200 so that Y-axis drive motor 20 is driven to move stage 12 in the "+" direction (at STP 13). When this movement reaches the value of the column width P (at STP 14), stage 13 is stopped (at STP 15).

Then, the signal corresponding to the ON and the signal corresponding to the movement of optical system 50 in the "−" direction are generated at lines 207 and 208 of control device 200, respectively, so that optical system 50 is started to move in the "−" direction (at STP 16). The position of stage 13 is detected by rotary encoder 71. When the coordinate values of the position detected reach the value $X_S$ (at STP 17) which was calculated at step 6 (355), the signals disappear from lines 207 and 208 so that the optical system is stopped (at STP 18).

Subsequently, the signal corresponding to the ON and the signal corresponding to the movement of optical system 50 in the "+" direction are generated again at lines 207 and 208 of control device 200, respectively, so that optical system 50 is started to move in the "+" direction (at STP 19). Simultaneously, the measurement of the light transmission of the pattern area for the new column is executed (at STP 8). The routines from STP 8 to STP 19 are repeated on and on until the measurements of the pattern area percentages of all the column rows on film 12, are ended. When stage 13 is moved stepwise of the column width P at STP 13 until its position reaches the value $Y_E$ calculated at step 6 (355) and when the pattern area percentage of the column row for that position is measured (at STP 20), the signal corresponding to the ON is generated at the lines of control device 200, and the signals for moving optical system 50 and stage 13, respectively, are generated at lines 208 and 212 so that optical system 50 and stage 13 are started to move toward their respective origins (at STP 21). If it is detected by noncontact switches 73 and 28 that the origins are reached, the signals disappear from lines 207, 208 and 211 and 212 of control device 200 so that optical system 50 and stage 13 are stopped to complete the operations of step 7 (356) (at STP 22). This completion is displayed by a lamp on the key board.

The respective steps from STP 1 to STP 22 thus far described are automatically processed and executed in accordance with the program which is stored in advance in ROM 202. Although the description of the present embodiment has been directed, for convenience of explanation, to the method in which film 12 is scanned in one direction, i.e., in the direction of the axis X and from $X_S$ to $X_E$, it is convenient for shortening the time required for measuring the whole surface of film 12 that the scanning operations are performed in reciprocal manner.

Step 8 (357): The routines from step 3 (352) to step 7 (356) are executed for all the films to be laid out. Nevertheless, as to the data input at step 4 (353), according to the present invention, it is sufficient that only the width of the film to be measured, the length in the top and bottom direction, the layout position and the recognition number be fed in for the films which are to be measured later from the second sheet.

Step 9 (358): When the measurements of all the films to be laid out are ended, the pattern area percentages measured are made to correspond to the column numbers and edited for the respective recognition numbers ($F_{ij}$, wherein: i=i, 2, . . . , and m; and j=1, 2, . . . , n) of the films until they are fed out to printer 206 and magnetic tape recorder 218.

These processing routines are automatically performed, when an editing push buttom is pushed, in accordance with the program which is stored in advance in ROM 202.

Step 10 (359): The ratios RP of the pattern area percentages to the column rows $CP_i$ (as shown in FIG. 20) of printing plate 300 are determined in the following manners. If n sheets of films $a_1$, $a_2$, . . . , $a_n$ are laid out in the column row $CP_i$, if the lengths of the respective films in the top and bottom direction are designated at $L_{F1}$, $L_{F2}$, . . . , $L_{Fn}$, if the pattern area percentages corresponding to the column rows $CP_i$ of the respective films are designated at $R_1$, $R_2$, . . . , and $R_n$, and if the value of the circumferential length of the printing drum, which is fed in at step 4 (353), the ratios $R_P$ are calculated by the following Equation:

$$R_P = (L_{F1} \times R_1 + K_{F2} \times R_2 + \ldots + L_{Fn} \times R_n)/L_P \quad (8)$$

$$= \left( \sum_{n=1}^{n} L_{Fi} \times R_i \right) /L_P, \ (i = 1, 2, \ldots, \text{and } n).$$

Therefore, if the measured results of the pattern area percentages, which were attained at step 7 (356) for the respective steps, are reedited for the respective values of the column numbers CN so that the calculations are performed in accordance with the foregoing Equation (8), the pattern area percentages of the respective columns for printing plate 300 are determined. Thus, arithmetically processing routines are automatically executed, if the push button for calculating the pattern area percentages is pushed, in accordance with the program which is stored in advance in ROM 202.

Step 11 (360): When the printing push buttom is pushed, the column number CN, the pattern area percentage $R_P$ for the column row, the number of the printing machine, the discrimination of the surface and back printing operations, the kind of colors and so on are fed out to printer 206 and magnetic tape recorder 218.

Step 12 (361): All the works are completed by the procedures from Step 12 to step 11 thus far described.

In case absolutely identical films are laid out in plural steps on an identical column row of printing plate 300 at step 8 (357), the measurement is executed for that film only one time, and the resultant data for the pattern area percentage are stored in places which are laid out to correspond to the recognition numbers of the respective films. Then, the time required for measuring the pattern area percentages for printing plate 300 can be conveniently further shortened. It is quite natural that the present embodiment can be easily so modified as to adopt that method. For example, it is sufficient that the conditions such as $L_{F1}=LF_2$ and $R_1=R_2$ are given to the Equation (8).

Although the description thus far made is directed to an example in which the measuring apparatus performs its measuring operations while having film 12 placed on transparent plate 22 attached to flat stage 13, as shown in FIG. 1. On the contrary, FIG. 21 shows another embodiment of the measuring apparatus which is equipped with a transparent drum 22A.

In FIG. 21, transparent drum 22A is made of glass and is rotated by a motor MTR 1. Film 12 to be measured is adhered to the outer circumference of transparent drum 22A.

In parallel with the axial direction of glass drum 22A and outside of same drum 22A, is arranged a feed screw 23A which is rotated by a motor MTR 2 so that a member 52B having a light emitting unit 52A is moved in the direction of axis X. Moreover, a member 51B having a light receiving unit 51A is inserted from the left into aforementioned glass drum 22A so that members 52B and 51B move together in the direction of axis X.

In the measuring apparatus thus constructed, it is quite natural that the movement of the direction of axis Y of FIG. 1 (i.e., the moving direction of stage 13) correspond to the rotational drive by the motor MTR 1 and that the program for the various processings of the measured data can be utilized without change.

According to the pattern area percentage measuring method and apparatus of the present invention, as has been described hereinbefore, there can be attained the following advantages:

(a) Since the procedures of regulating the columns, which are divided on the printing plate, on the film in a manner to correspond to the columns can be automatically executed for any layout of the printing plate measuring the pattern areas from the film can be easily carried out.

(b) Since the recognition numbers are assigned to the films in a manner to correspond to the layout positions and since the measured data are edited and recorded for the respective numbers, the pattern areas for the printing plate having its film layout changed can be calculated, if the measurements are executed only for the films to be measured, so that the partial change of the printing plate can be easily coped with.

(c) The measurements can be executed in a manner to correspond the width and number of the ink adjusting keys, both of which are different for the printing machine used.

(d) Since the measurements can be directly executed by the light transmission detecting system for engraving the films as is different from those from the proof or the printing plate, they can be performed highly precisely and stably.

(e) Since the measurements can be executed while having the light source unit and the light receiving unit integrated, there is little dispersion in the measured values.

It is to be understood that the invention is not limited in its application to the details of construction and arrangement of parts illustrated in the accompanying drawings, since the invention is capable of other embodiments and of being practiced or carried out in various ways.

What is claimed is:

1. Apparatus for measuring pattern area percentages of each of a plurality of columns into which a plurality of engraving films having a matter to be printed on a printing plate are divided, said columns corresponding to the spacing of ink supply adjusting keys of a printing machine comprising:

a base;

a stage slidably mounted on said base for movement in a direction Y;

a transparent member mounted on said stage for receiving one of said plurality of films thereon;

optical means mounted on said base for movement in a direction X perpendicular to said direction Y including a light source mounted on one side of said transparent member, a single light detector mounted on the other side of said transparent member facing said light source to produce an output, means between said source and detector defining a rectangular measuring area through which light passes from said source to said detector, and means for adjusting the width of said rectangular area;

means for driving said stage and said optical means respectively in said Y and X directions; and control means including means for storing data relating to the number and spacing of the ink supply adjusting keys of the printing machine, the size of the engraving film and the printing position of the film on the printing plate and microprocessor means for determining the divisions of the columns to be measured on said film in accordance with the stored data, producing control signals for adjusting the width of said rectangular area in accordance with the determined divisions, producing drive signals for said drive means and calculating the pattern area percentages of each column from the output of said light detector.

2. An apparatus for measuring pattern area percentage of an engraving film as in claim 1, wherein said transparent member has a mark with which a mark on said film is laid out so as to coincide.

3. An apparatus for measuring pattern area percentage of an engraving film as in claim 1, wherein said control means includes means for inputting data relating to layout information of said films.

4. A method for measuring pattern area percentage of each of the columns which are so divided in a matter to be printed, by means of a printing plate as to correspond to the spacings of ink suppy adjusting keys of a printing machine, from an engraving film mounted on an apparatus of the type which provides a transparent member for receiving said film thereon, optical means for measuring light transmission quantities passing through the film from a light source, and moving means for relatively moving both said optical means and said film receiving means, and control means which has a memory in which data concerning light transmission quantities from said optical means are stored and which has means for calculating the pattern area percentage corresponding to each column defined on said printing plate, said method comprising the steps of;

placing the engraving film on said transparent member;

applying to said control means that data concerning the member and spacings of ink supply adjusting keys mounted on the printing machine, the size of said engraving film and the data concerning printing positions of said film on the printing plate, thereby corresponding the areas of said film on said transparent member to the columns defined on the printing plate;

measuring light transmission quantities for each each corresponding area of the film by operating said optical means and moving means; and calculating pattern area percentage of each column by averaging light transmission quantities of each identical areas of engraving films.

* * * * *